May 7, 1935. G. B. LINDERMAN, JR 2,000,527
RECORDER CHART
Filed Oct. 21, 1931

Inventor
Garrett B. Linderman Jr.
By Strauch & Hoffman
Attorneys

Patented May 7, 1935

2,000,527

UNITED STATES PATENT OFFICE 2,000,527

RECORDER CHART

Garrett B. Linderman, Jr., Pittsburgh, Pa., assignor to Pittsburgh Equitable Meter Company, Pittsburgh, Pa., a corporation of Pennsylvania Application October 21, 1931, Serial No. 570,216

4 Claims. (Cl. 234—1)

This invention relates to recording gauge charts, but may be used in connection with any recorder that employs a chart as a recording medium.

In gauges or meters of the recording type, various properties such as pressure and volume of the flowing medium passing therethrough, such as gas, oil, steam, water, etc., are measured by suitable means. The measuring means are interconnected with a pen or stylus which produces a traced line on a paper chart the traced line representing values of pressure, volume etc. This paper chart has a series of reference lines printed thereon that form a background for the traced lines and serve as axes of abscissas and ordinates so that the values of all points of the curves traced thereon may be conveniently read therefrom. These values may be used as a basis for computing the flow handled by the gauge or meter or in other ways in well known manner.

It has been found in practice that the paper of which these charts are made absorbs varying quantities of moisture, depending upon the moisture content of the air surrounding the gauge in which they are located. In absorbing moisture these charts swell or expand an amount proportional to the amount of moisture that they have absorbed. This swelling or expansion renders the indications given by the chart incorrect inasmuch as the space between the lines printed thereon has been lengthened as a result of such expansion. Obviously the determination of the flow handled by this gauge, if based upon the reading of this chart will be erroneous. In an actual test upon gauges of this type the charts have been found to expand 0.04 inch in 10 inches between the dry and moisture absorbed states, which produces a relatively large error in the computation of flow handled by the gauge.

Obviously if the chart paper would expand only a certain given amount regardless of the humidity of the surrounding air this expansion could be allowed for and no error in the computation of flow would result. However, the charts in practice expand an amount proportional to the humidity of the air surrounding the instrument thus producing varying errors which are impossible to allow for. Sometimes these gauges are placed in locations where steam is present in the atmosphere, for instance in the boiler rooms, and the charts in these locations accordingly absorb an excessive amount of moisture which produces a correspondingly large error in the indicated consumption.

Another disadvantage of the charts now in use is that they do not under all conditions lie perfectly flat on the chart plate with the result that the pen or stylus does not readily pass over the face of them. Consequently the tracing produced frequently gives an erroneous indication wherever the chart has been out of firm contact with the chart plate.

In practice these charts are filed away for reference and due to their temporary character the tracings thereon become illegible and accordingly must be discarded.

To overcome these disadvantages, it is a primary object of the present invention to provide a chart, the area of which will be constant at all times, regardless of the moisture content of the air surrounding the instrument in which it is located.

A further object is to provide a chart that will lie flat on the chart plate so that errors of tracing will be minimized.

Another object of this invention is to provide a chart that is of a permanent nature so that when filed away for reference the same will remain in good condition for long periods of time.

Other objects of the present invention will appear as the description thereof proceeds in connection with the drawing, in which drawing.

Figure 1:
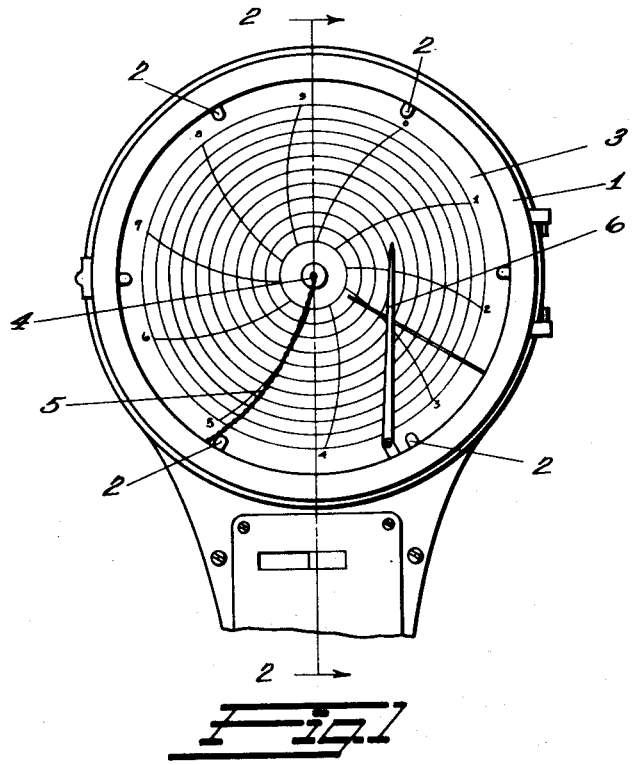
Figure 1 is a view of my improved chart in position in a well known make of recorder, the glass being removed for the sake of clarity.

Referring to the drawing wherein like reference characters designate like parts in the several views, a well known type of a gauge is shown and designated broadly by the reference character 1.

A stationary chart plate (not shown) is mounted in the gauge casing which has tongues 2 struck out of and overlying the face of the same to hold the edges of the chart 3 against the face of the chart plate. A knob 4 having a retaining chain 5 swivelled thereon detachably clamps the central portion of the chart in place. The arm 6 carrying a pen or stylus is connected to the gauge mechanism in well known manner.

While I have shown my chart applied to the illustrated type of recording instrument it is to be understood that it may be applied to any gauge or meter having a chart for use in connection therewith. For instance in the electrical industry strip type as well as circular type recording instruments are employed and it is contemplated to use my improved chart material for such charts.

Figure 2:
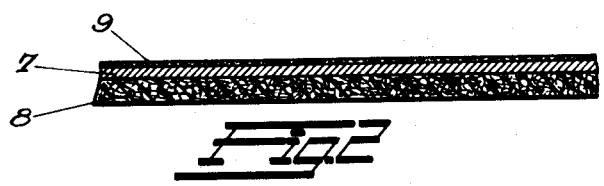
Figure 2 is an enlarged fragmentary sectional view of my improved chart.

In Figure 2 is shown an enlarged sectional view of the preferred form of chart. As is seen in that figure the chart is of laminated structure and consists of a sheet of metal foil 7 firmly secured at every point in any suitable manner, for instance by glue, to a sheet of paper 8. While many different metals may be used for the foil, I have found that aluminum foil of approximately .002 inch in thickness is very satisfactory for this purpose. The paper used may vary somewhat in thickness, but I prefer to use a paper that is from 0.003 to 0.004 inch in thickness.

It is seen that the metal foil being impervious to moisture does not respond to atmospheric moisture conditions and remains constant in area. The paper sheet serves as a backing or reenforcing member for the foil and provides a laminated structure that will remain flat under all conditions. The foil covering one face of the paper sheet prevents the absorption of moisture by this face which accordingly further reduces the tendency of the sheet to expand in response to moist air conditions existing in the region of the instrument.

A tracing is produced on the chart face by using a sharp stylus for cooperation with the thin coating of lamp black 9 which covers the foil side of the chart. While I have disclosed lamp black as a coating it is to be understood that the foil side of the chart may be coated with any other medium which is suitable for this purpose such as paraffin, varnish, etc., without departing from the spirit of the present invention. Moreover the foil may be etched or inked with a special ink for producing a visible tracing thereon.

Figure 3:
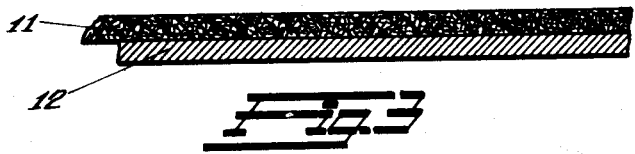
Figure 3 is a view similar to Figure 2 showing a modified form of chart.

In Figure 3 a modified form of chart is disclosed wherein the chart paper 11 is secured by any suitable adhesive material to a stiffening backing member comprising a sheet of metal foil 12, the materials employed in this form of the invention have substantially the same characteristics as the materials employed in the preferred form of invention. The foil as in the preferred form of chart functions as an expansion restraining member since it is adhesively secured to the entire face of the paper. In so covering one face of the paper, the foil, being impervious to moisture, prevents the absorption of moisture by this face of the paper and thus, in connection with its restraining function, further prevents the paper from expanding.

Figure 4:
Figure 4 is a sectional view of a further modification.

In Figure 4 a further modification of my improved recorder chart is disclosed. This form of chart is a laminated structure comprising a sheet of metal foil 13 similar to the foil used in the previous forms herein disclosed. Upon each face of this foil is adhesively secured thereto at all points a sheet of suitable chart paper 14. The foil in this form functions as a paper expansion restraining element as in the chart disclosed in Figures 2 and 3. In connection with this form of chart it will be seen that in the event that same is exposed to excessive moisture conditions causing the paper sheets thereof to tend to expand, no curling or wrinkling of the chart will take place in that both paper sheets have one face thereof exposed and therefore tend to expand uniformly, and since each sheet is individually restrained by the foil and located on opposite sides thereof, one equalizes or balances the effect of the other.

A further advantage of this type of chart is that the same after being traced upon one side thereof may be inverted and traced upon the other side.

Inasmuch as the recording faces of the modified forms of my chart are of paper the same methods of inking them may be employed that are used in connection with the ordinary paper charts now on the market.

All of the charts disclosed herein have been found in practice to give very excellent results, they pass smoothly under the pen or stylus and the flow handled by the gauge or meter, in which they are located, is correctly given from the indications traced thereon. These charts have been exposed to adverse atmospheric conditions and have been found to remain substantially flat on the chart plate, and the area of the charts after such exposure has been checked and found to be the same as before exposure.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having now clearly set forth my invention, what I regard as new and desire to secure by Letters Patent of the United States is:

1. A recording instrument chart resisting expansion due to change in humidity consisting of a layer of aluminum foil uniformly adhesively secured between sheets of chart paper.

2. A recording instrument chart resisting expansion due to changes in humidity consisting of external paper layers suitable for taking an inscription thereon having a sheet of metal foil therebetween, said foil and paper being joined uniformly by an adhesive.

3. A recording instrument chart comprising external layers of paper, at least one of said layers being provided with indicia signifying quantities or measurements, the paper thereof being suitable for taking an inscription thereon to cooperate with said indicia, a sheet of metal foil between said paper layers and uniformly joined thereto by an adhesive bond to cause said chart to be resistant to expansion due to changes in humidity so that said indicia will not vary in position and the inscription when drawn on said chart will be properly positioned with respect to said indicia.

4. A recording instrument chart comprising external layers of paper suitable for taking an inscription thereon, one of said layers being provided with indicia signifying quantities and measurements, said paper layers being uniformly joined to a central layer of metal foil by an adhesive bond to cause said chart to be resistant to distortion due to changes in humidity so that the position of said indicia on said chart will not vary in position.

GARRETT B. LINDERMAN, Jr.